United States Patent
Nabi et al.

(10) Patent No.: US 10,754,694 B2
(45) Date of Patent: Aug. 25, 2020

(54) ROLLING UPGRADE WITH DYNAMIC BATCH SIZE

(71) Applicants: Mina Nabi, Montreal (CA); Maria Toeroe, Montreal (CA); Ferhat Khendek, Montreal (CA)

(72) Inventors: Mina Nabi, Montreal (CA); Maria Toeroe, Montreal (CA); Ferhat Khendek, Montreal (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 145 days.

(21) Appl. No.: 16/070,097

(22) PCT Filed: Jan. 29, 2016

(86) PCT No.: PCT/IB2016/050474
§ 371 (c)(1),
(2) Date: Jul. 13, 2018

(87) PCT Pub. No.: WO2017/130030
PCT Pub. Date: Aug. 3, 2017

(65) Prior Publication Data
US 2019/0034240 A1 Jan. 31, 2019

(51) Int. Cl.
*G06F 9/50* (2006.01)
*G06F 8/656* (2018.01)
(Continued)

(52) U.S. Cl.
CPC ............ *G06F 9/5033* (2013.01); *G06F 8/65* (2013.01); *G06F 8/656* (2018.02);
(Continued)

(58) Field of Classification Search
CPC .................................................. G06F 9/5033
See application file for complete search history.

(56) References Cited

U.S. PATENT DOCUMENTS 6,052,531 A * 4/2000 Waldin, Jr. ............... G06F 8/64
717/170
7,228,453 B2 6/2007 O'Brien et al.
(Continued)

FOREIGN PATENT DOCUMENTS

WO 2015/132634 A1 9/2015

OTHER PUBLICATIONS

Mina Nabi et al.: Upgrade of the IaaS Cloud: :Issues and Potential Solutions in the Context of High-Availability; 4 pages; 2015.

*Primary Examiner* — Sisley N Kim
(74) *Attorney, Agent, or Firm* — Julie Dufort; Ericsson Canada Inc.

(57) ABSTRACT

A system is upgraded by rolling upgrade with dynamic batch sizes in multiple iterations. The system includes multiple hosts that host multiple resources. The rolling upgrade calculates a number of hosts to upgrade and a number of resources to upgrade for each iteration. The calculation subtracts a reserved number of hosts from a capacity of the system to account for potential failover and potential resource scaling operations during the iteration. Based on the calculated number of hosts to upgrade, it is determined whether the system has a capacity for upgrade. If the capacity exists, the calculated number of hosts to upgrade and the calculated number of resources to upgrade are upgraded, while accepting resource scaling requests during the iteration.

22 Claims, 11 Drawing Sheets

(51) Int. Cl.
  *G06F 8/65* (2018.01)
  *G06F 9/455* (2018.01)
  *H04L 12/24* (2006.01)
  *H04L 12/911* (2013.01)

(52) U.S. Cl.
  CPC ........ *G06F 9/45558* (2013.01); *G06F 9/5077* (2013.01); *G06F 9/5083* (2013.01); *H04L 41/5041* (2013.01); *H04L 47/781* (2013.01); *G06F 2009/45583* (2013.01); *G06F 2209/5014* (2013.01); *G06F 2209/5019* (2013.01); *H04L 41/5096* (2013.01)

(56) References Cited

U.S. PATENT DOCUMENTS

| | | |
|---|---|---|
| 8,359,594 B1 | 1/2013 | Davidson et al. |
| 8,782,632 B1 | 7/2014 | Chigurapati et al. |
| 2006/0130042 A1* | 6/2006 | Dias ............ G06F 9/5083 717/168 |
| 2009/0198769 A1* | 8/2009 | Keller ............ H04L 67/34 709/203 |
| 2011/0202917 A1* | 8/2011 | Laor ............ G06F 8/65 718/1 |
| 2012/0102480 A1 | 4/2012 | Hopmann et al. |
| 2013/0024862 A1 | 1/2013 | Lim et al. |

* cited by examiner

| Tenant | Initial Number of VMs | Min-size | Max-size | New Version |
|---|---|---|---|---|
|  | 3 | 2 | 6 |  |
|  | 4 | 3 | 7 |  |
|  | 3 | 3 | 5 |  |
|  | 2 | 1 | 4 |  |

ROLLING UPGRADE WITH DYNAMIC BATCH SIZE

TECHNICAL FIELD

Embodiments of the disclosure relate generally to systems and methods for rolling upgrade in a cloud computing environment.

BACKGROUND

In the Infrastructure as a service (IaaS) cloud service model, there are three types of resources: physical resources, virtualization facilities and virtual resources. Each of these resources can be upgraded over time for different reasons. The service delivered by the IaaS layer may be affected during the upgrades. Some systems tolerate capacity reduction and outages caused by offline upgrade, in which part of the system is taken out of service for the duration of the upgrade. High availability (HA) systems do not tolerate more than five minutes downtime in a year. More specifically, HA systems provide services that are available 99.999% of time. Availability is a non-functional requirement which determines the percentage of the time a system or a service has to be accessible.

One of the main challenges of maintaining HA in the cloud during upgrades is the dynamicity of the environment. A cloud system is a dynamic environment that scales in and out according to the workload changes. During an upgrade, some services (a.k.a. virtual resources) provided by IaaS may scale out to accommodate increased workload, which consumes extra capacity. While other virtual resources of the system may scale in due to workload decrease. Also, new resources (physical and/or virtual) can be added or removed from the system. This scaling feature of the cloud may interfere and even conflict with the upgrade process.

One solution for the upgrade is to create an entirely new system with upgraded resources. The traffic is redirected to this new system once it is ready for service. However, creating a new system duplicates the resources needed. Thus, this solution is expensive and does not apply in all cases.

SUMMARY

In one embodiment, a method is provided for rolling upgrade of a system that includes a plurality of hosts hosting a plurality of resources. The method comprises calculating a number of hosts to upgrade and a number of resources to upgrade for each of a plurality of iterations, wherein the calculating subtracts a reserved number of hosts from a capacity of the system to account for potential failover and potential resource scaling operations during the iteration. The method comprises determining whether the system has the capacity for upgrade based on the calculated number of hosts to upgrade, and in response to a determination that the capacity exists, upgrading the calculated number of hosts to upgrade and the calculated number of resources to upgrade while accepting resource scaling requests during the iteration.

In another embodiment, there is provided a system operable to rolling upgrade a plurality of resources and a plurality of hosts hosting the resources, the system comprising circuitry including processing circuitry and memory, the memory containing instructions executable by the processor, wherein the system is operative to calculate a number of hosts to upgrade and a number of resources to upgrade for each of a plurality of iterations, wherein the calculate is to subtract a reserved number of hosts from a capacity of the system to account for potential failover and potential resource scaling operations during the iteration. The system is operative to determine whether the capacity exists for upgrade based on the calculated number of hosts to upgrade, and in response to a determination that the capacity exists, upgrade the calculated number of hosts to upgrade and the calculated number of resources to upgrade while accepting resource scaling requests during the iteration.

In another embodiment, there is provided a network node comprising processing circuitry and memory. The memory contains instructions executable by the processing circuitry to perform rolling upgrade of a plurality of resources and a plurality of hosts hosting the resources. The network node is operative to calculate a number of hosts to upgrade and a number of resources to upgrade for each of a plurality of iterations, wherein the calculate is to subtract a reserved number of hosts from a capacity of the system to account for potential failover and potential resource scaling operations during the iteration. The network node is operative to determine whether the capacity exists for upgrade based on the calculated number of hosts to upgrade, and upgrade, in response to a determination that the capacity exists, the calculated number of hosts to upgrade and the calculated number of resources to upgrade while accepting resource scaling requests during the iteration.

In another embodiment, there is provided a server instance, in a cloud computing environment providing processing circuitry and memory. The memory contains instructions executable by the processing circuitry to perform rolling upgrade of a plurality of resources and a plurality of hosts hosting the resources. The server instance is operative to calculate a number of hosts to upgrade and a number of resources to upgrade for each of a plurality of iterations, wherein the calculate is to subtract a reserved number of hosts from a capacity of the system to account for potential failover and potential resource scaling operations during the iteration. The server instance is operative to determine whether the capacity exists for upgrade based on the calculated number of hosts to upgrade, and in response to a determination that the capacity exists, upgrade the calculated number of hosts to upgrade and the calculated number of resources to upgrade while accepting resource scaling requests during the iteration.

In yet another embodiment, there is provided a method of rolling upgrade of a system including a plurality of resources and a plurality of hosts hosting the resources, the method performed by a server instance, in a cloud computing environment providing processing circuitry and memory. The memory contains instructions executable by the processing circuitry to perform the method comprising calculating a number of hosts to upgrade and a number of resources to upgrade for each of a plurality of iterations, wherein the calculating subtracts a reserved number of hosts from a capacity of the system to account for potential failover and potential resource scaling operations during the iteration. The method further comprises determining whether the system has the capacity for upgrade based on the calculated number of hosts to upgrade, and in response to a determination that the capacity exists, upgrading the calculated number of hosts to upgrade and the calculated number of resources to upgrade while accepting resource scaling requests during the iteration.

In yet another embodiment, there is provided a network node operable to perform rolling upgrade of a plurality of resources and a plurality of hosts hosting the resources. The network node comprises a calculator module to calculate a number of hosts to upgrade and a number of resources to upgrade for each of a plurality of iterations, wherein the calculate is to subtract a reserved number of hosts from a capacity of the system to account for potential failover and potential resource scaling operations during the iteration. The network node comprises a decision module to determine whether the capacity exists for upgrade based on the calculated number of hosts to upgrade, and an upgrade module to upgrade, in response to a determination that the capacity exists, the calculated number of hosts to upgrade and the calculated number of resources to upgrade while accepting resource scaling requests during the iteration.

In another embodiment there is provided a method comprising initiating an instantiation of a server instance in a cloud computing environment which provides processing circuitry and memory for running the server instance. The server instance is operative to calculate a number of hosts to upgrade and a number of resources to upgrade for each of a plurality of iterations, wherein the calculate is to subtract a reserved number of hosts from a capacity of the system to account for potential failover and potential resource scaling operations during the iteration. The server instances is operative to determine whether the capacity exists for upgrade based on the calculated number of hosts to upgrade, and in response to a determination that the capacity exists, upgrade the calculated number of hosts to upgrade and the calculated number of resources to upgrade while accepting resource scaling requests during the iteration.

Other aspects and features will become apparent to those ordinarily skilled in the art upon review of the following description of specific embodiments in conjunction with the accompanying figures.

BRIEF DESCRIPTION OF THE DRAWINGS

Embodiments will now be described, by way of example only, with reference to the attached figures.

DETAILED DESCRIPTION

Figure 1:
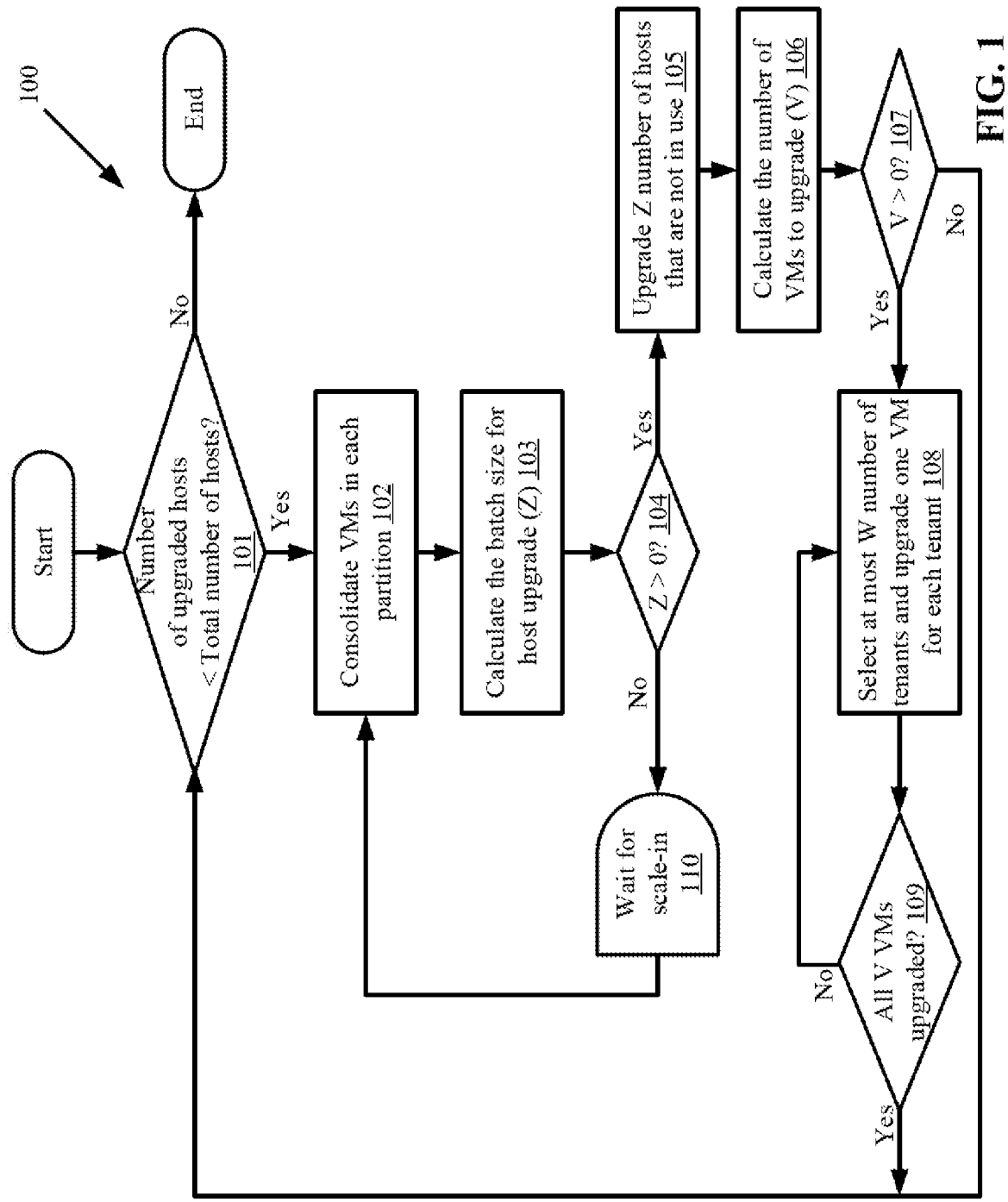
FIG. 1 illustrates a rolling upgrade process according to one embodiment.

Reference may be made below to specific elements, numbered in accordance with the attached figures. The discussion below should be taken to be exemplary in nature, and should not be considered as limited by the implementation details described below, which as one skilled in the art will appreciate, can be modified by replacing elements with equivalent functional elements.

To maintain the system availability during upgrades, cloud providers may perform rolling upgrades. With rolling upgrades, the system is upgraded in a number of batches. The system is upgraded iteratively one batch at a time in a rolling fashion. In each iteration, a batch size number of hosts are taken out of service for upgrade and subsequently added back to the system.

Conventional rolling upgrade uses a predefined batch size for each iteration of the upgrade, and scaling is disabled during the upgrade. This is because with the conventional rolling upgrade, scaling not only may conflict with the upgrade process, but may also be counter-efficient to the upgrade process. This may occur when the system scales in after an upgrade and removes the just upgraded resources. If the old version of the resources is used for scaling out, these resources need to be upgraded as well.

A system and method for rolling upgrade of a cloud system is provided herein. The rolling upgrade approach described herein uses a dynamic batch size for each iteration of the upgrade process. The rolling upgrade approach addresses the issue of scaling and availability during the upgrade. In this approach, the upgrade process starts when the system has enough capacity for scaling, failure handling and upgrade. The upgrade continues as long as the capacity exists, while maximizing the number of resources upgraded in each iteration. The upgrade process is suspended when the number of resources drops below what is needed for scaling and protecting the service, and it resumes when resources become available.

In each upgrade iteration, the batch size is determined based on the current situation of the system, with consideration for potential scaling and failover operations. More specifically, the batch size is determined based on the current situation in terms of the total number of hosts, the number of hosts in use, and the number of hosts to reserve for scaling out and failover. The versions of the hosts and resources are also taken into account in determining the batch size. The batch size is adjusted dynamically according to the dynamicity of the cloud environment. As a result of this approach, the upgrade process can start automatically when the system can tolerate that the hosts are taken out of service for the purpose of their upgrade, with the least impact on the high availability of the system and on the scaling operations. Accordingly, scaling is enabled during the upgrade process as the scaling operations regulate the pace of the upgrade.

To eliminate the interference with the scaling operations, the upgrade process works hand in hand with scaling. On the one hand, specific scaling strategies are used during the upgrade, and, on the other hand, the upgrade strategy complies with the constraints imposed by the scaling operations. For example, scaling operations may specify which version of the resource (e.g. VM) is to be scaled in/out. Because of possible incompatibility issues between the upgraded (i.e. new) and un-upgraded (i.e. old) versions of the resources, the old and new versions of the scaling space are considered separately according to the availability of the hosts and resources in each iteration.

The approach described herein is applicable to the upgrade of a variety of entities in the IaaS layer. The following describes an embodiment in which a system of hosting entities and their hosted entities are to be upgraded. The hosting entities are hypervisors and their hosted entities are virtual machines (VMs); that is, VM services provided by the IaaS. In this embodiment, the type of the hypervisor is upgraded. Since the new type of hypervisor is incompatible with the old version of VMs, in addition to upgrading the hypervisors, the VMs are also upgraded by having their base images converted. The upgraded VMs are then placed on (migrated to) the new hypervisor. In this situation, live migration is not possible between the old and new types of the hypervisor; the new versions of the VMs are scaled on hosts with the upgraded hypervisors.

It is understood that the rolling upgrade approach can be applied to the upgrade of any hosting and hosted entities, including physical and virtual entities. In one embodiment, the hosting entity may be a service provider and the hosted entity may be a service to be provided according to some constraints (e.g. number of assignments, placement and scaling, etc.). Although VMs are referred to as the hosted entities in the examples below, VMs may be hosting entities for other resources such as containers, which in turn may be hosting entities themselves. A container is a software component that can contain other components within itself. Multiple containers can share the same operating system (OS) instance, and each container provides an isolated execution environment for its contained component. As opposed to VMs, containers and their contained components share the same host OS instance nd therefore create less overhead.

To maintain the availability of the VMs during the upgrade process, resources are reserved for protecting the VMs in case of failure of a physical host machine or hypervisor. In these cases, the VMs deployed on the failed host are failed over to another available host with a hypervisor of the same type. Therefore, at least one available host is kept for the purpose of failover for each type of the hypervisors.

For each iteration of the upgrade, the batch sizes for upgrading the hosts and the VMs are calculated. The calculation takes into account the placement constraints of the VMs, and that scaling requests may arrive concurrently with failure of some hosts during the upgrade. Therefore, a number of hosts are reserved for the scaling and failover operations. The reservation for scaling is made in the partition of the system, which contains the upgraded hosts (i.e. new partition) if there is already an upgraded VM; otherwise, the reservation for scaling is made in the old partition, which contains the un-upgraded hosts. The reservation for failover is made in both partitions to compensate for the hypervisor incompatibility.

The IaaS layer is responsible for maintaining the high availability of VMs. An availability mechanism is provided for maintaining the high availability of the application deployed in the VMs, and a redundancy scheme is used to protect the applications. The needs of this application level redundancy are expressed towards the IaaS as VM placement constraints, which are respected at all times including the upgrade. There are two types of placement constraints in a cloud environment: affinity groups and anti-affinity groups. For the purpose of the upgrade, the anti-affinity groups are considered. The anti-affinity groups express which VMs cannot be placed together on the same host. Thus, considering the application level redundancy, VMs of the same anti-affinity group cannot be upgraded at the same time as they may form a redundant pair, i.e. providing and protecting a given application service.

In one embodiment, in each upgrade iteration, hosts are reserved for the possible scaling out operation for each anti-affinity group. In our approach, scaling out in the new partition is reserved only for those anti-affinity groups that have already upgraded VMs. Scaling out for the others with only un-upgraded VMs is reserved in the old partition.

Based on these considerations, the dynamic rolling upgrade can be formalized as follows. Assume that the IaaS of a data center consists of M physical hosts, each of which has a capacity for hosting K VMs. For simplicity, it is assumed that the data center contains identical hosts and equal-sized VMs. Furthermore, it is assumed that the IaaS serves N anti-affinity groups. Each of these anti-affinity groups has a number of VMs that may scale between $min_n$ and $max_n$, where $min_n$ is the minimum number of VMs and $max_n$ is the maximum number of VMs that the IaaS has agreed to provide for the anti-affinity group n, where n is an index from 1 to N. To ensure application level service availability, the VMs of an anti-affinity group are upgraded one at a time and placed on different hosts to respect the anti-affinity constraint. To simplify the discussion, it is assumed that each anti-affinity group belongs to a different tenant.

In one embodiment, cooldown and scaling adjustment are two parameters related to scaling operations. The cooldown is the minimum amount of time permitted between subsequent scaling operations, and the scaling adjustment is the size of the adjustment in a scaling operation. For example, assume that a system has a CPU threshold of 70% with cooldown of 60 seconds and scaling adjustments of one; this means that if the CPU utilization goes beyond 70% for 60 seconds, one new resource (e.g. VM) will be added.

Furthermore, since hosts in each batch are upgraded in parallel, the time it takes to upgrade a batch is equal to the time it takes to upgrade one host with K VMs. Accordingly, Equation 1 calculates the total scaling adjustment T, which is the number of VMs that may need to be accommodated for scaling out during the upgrade of a batch. More specifically, the total scaling adjustment T is equal to the maximum of the number of adjustments that may be requested during the upgrade of a single batch multiplied by the scaling adjustment among the different tenants. The maximum among all tenants is taken so that the reservations will be made according to the worst-case scenario; i.e., the reservations may be over-dimensioned rather than under-dimensioned.

$$T = \max\left(\text{scaling } adjustment_n * \left\lceil \frac{\text{time of upgrade}}{cooldown_n} \right\rceil \right) \quad \text{(Equation 1)}$$

FIG. 1 is a flow diagram illustrating a rolling upgrade process 100 according to one embodiment. Before describing the process 100, a complete list of parameters used in the formalization for calculating the upgrade batch size is provided below in Table 1.

TABLE 1

| List of parameters to calculate the upgrade batch size | |
|---|---|
| $M_i$ | total number of hosts, which may change over time, i.e. a failed host may be removed permanently from the system |
| K | host capacity in terms of VMs |
| $N_i$ | number of tenants (aka anti-affinity groups), which may change overtime, i.e. a new tenant could be added |
| $T_i$ | total scaling adjustment, which may change when the number of tenants changes |
| F | number of hosts reserved for failover |
| $X_i$ | number of hosts in use with the old version |

TABLE 1-continued

List of parameters to calculate the upgrade batch size

| | |
|---|---|
| $U_i$ | number of upgraded hosts |
| $Y_i$ | number of hosts in use that has been upgraded |
| $Z_i$ | the upgrade batch size in terms of hosts |
| $V_i$ | the total number of VMs that can be upgraded in iteration i |
| $W_{ij}$ | the upgrade batch size in terms of VMs where each VM belongs to a different tenant (i is the number of iterations, and j indicates the internal iteration number for upgrading VM) |

Index i in Table 1 is an iteration index. During the upgrade, the number of hosts M and the number of tenants N may change from iteration to iteration; e.g., failed hosts may be removed from the system, or new tenants may be added. Because a new tenant may have a different scaling adjustment, each time a tenant is added or removed, T is reconsidered to determine whether it needs adjustment.

The process 100 is iterative. At the beginning of each iteration, it is determined whether the number of upgraded hosts is less than the total number of hosts to upgrade (step 101). If it is, the process continues; otherwise the process ends. To maximize the batch size, the system is consolidated in terms of the VMs in the old and new partitions (step 102). That is, the system uses the minimum number of hosts for the number of VMs that it provides, while respecting the anti-affinity groups. After each iteration, the system is adjusted so that it remains consolidated.

The batch size for hosts ($Z_i$) is calculated at each iteration (step 103) using Equation 2 or Equation 3, depending on whether the number of hosts of the old version in use ($X_i$) is greater than zero or equal to zero, respectively.

$$Z_{i+1} = M_i - U_i - X_i - \left(T_i * \left\lceil \frac{\left(\begin{array}{c}\text{number of tenants with no new } VMs \\ \text{who did not reach their Max}\end{array}\right)}{K} \right\rceil\right) - F \text{ when } X_i > 0 \quad \text{(Equation 2)}$$

$$Z_{i+1} = M - U_i \text{ when } X_i = 0 \quad \text{(Equation 3)}$$

Equation 2 calculates the batch size according to one embodiment. From the total number of $M_i$ hosts, $U_i$ hosts have been upgraded already and $X_i$ hosts are in use and cannot be upgraded. Additional hosts are reserved for potential scaling and failover for the tenants with VMs of the old version. The reserved number of hosts for scaling is calculated by multiplying the total scaling adjustment ($T_i$) with the number of tenants that have no new VMs and that have not reached their maximum number of VMs (i.e. $max_n$), divided by the host capacity in terms of the number of VMs (i.e. K). The reserved number of hosts for failover is F, which is one for a system protecting against single failure.

Once no more hosts of the old version are in use, i.e. $X_i = 0$, all the remaining hosts can be upgraded in the next iteration according to Equation 3, and with that the upgrade completes.

After the calculation of the batch size ($Z_i$), it is determined whether $Z_i$ is greater than zero (step 104). As long as $Z_i$ is greater than zero, a number $Z_i$ of hosts of the old version that are not in use are selected and upgraded (step 105). Otherwise, the process 100 waits for freed resources (step 110); that is, until there are enough hosts freed up through scaling in of the tenants and consolidation of the VMs. After a scaling in, the batch size is recalculated to determine whether the process 100 can proceed. Note that the process 100 will proceed only when at least one host in either the new or the old partition becomes available in addition to the scaling and failover reservations.

In addition to calculating the batch size ($Z_i$) for the hosts, the total number ($V_i$) for upgrading the VMs in an iteration is also calculated (step 106). Equation 4 calculates the total number of VMs that can be upgraded in each iteration of the host upgrade.

$$V_i = \left(U_i - Y_i - \left(T_i * \left\lceil \frac{\left(\begin{array}{c}\text{number of tenants with new } VMs \\ \text{who did not reach their Max}\end{array}\right)}{K} \right\rceil\right) - F\right) * K \quad \text{(Equation 4)}$$

When calculating the total number of VMs ($V_i$) to upgrade in an iteration, a number of upgraded hosts are reserved for scaling out and for failover for the tenants with the new version of VMs. VMs can be upgraded if $V_i$ is greater than zero (step 107); otherwise, the VMs cannot be upgraded in this iteration.

To comply with the anti-affinity constraint, the number of VMs in a single iteration cannot be more than the number of tenants with the old version of VMs. Therefore, each iteration (i) may be divided into a number of sub-iterations (j) if $V_i$ is greater than the number of tenants with the old version of VMs. In each sub-iteration, the batch size for VM upgrade $W_{ij}$ is $V_i$ if $V_i$ is less than the number of tenants with the old version; otherwise, $W_{ij}$ is not greater than the number of tenants with the old version, where one VM is selected for upgrade for each tenant (step 108). The sub-iterations continue until all $V_i$ VMs are upgraded (step 109). The process 100 then continues to step 101 to determine whether to proceed with a next iteration.

In one embodiment, two criteria may be used for selecting the tenants and their VMs for upgrade. In the first criterion, in order to free more hosts, tenants with the highest number of old VMs are selected. In the second criterion, to minimize the number of VM migrations at VM consolidation, VMs of the hosts that have more VMs from the selected group of tenants are selected.

Since in this example, VMs and hypervisors of different versions are incompatible with each other, during the upgrade the VM images are limited (in cloud terms, isolated) to the compatible partitions, which are updated in each iteration as necessary. That is, VMs of the old version stay in the old (un-upgraded) partition and VMs of the new version are in the new (upgraded) partition. Both partitions are updated during each iteration where an upgrade operation is performed.

The process 100 of FIG. 1 applies to other hosting and hosted entities that are different from the aforementioned hypervisors and VMs; the elements of the equations that are irrelevant can be omitted from the calculations. For example, if the new hypervisor is compatible with the VMs of the old version, but the old hypervisor cannot run VMs of the new version, then it is sufficient to reserve capacity for scaling and failover only in the new partition.

Figure 2:
FIG. 2 illustrates an example of rolling upgrade according to one embodiment.
Figure 2:
Figure 2:
Figure 2:
Figure 2:
Figure 2:
Figure 2:
Figure 2:

The following example is provided to further explain the rolling upgrade approach according to one embodiment. The example is shown in detail in FIG. 2 to FIG. 9. In this example, there are 10 hosts (M=10) serving VMs from 4 different tenants (N=4). It is assumed in this example that M and N do not change during the upgrade. Different patterns are used to show the VMs of different tenants. Each host has the capacity to serve 3 VMs (K=3). FIG. 2 shows that each of these tenants has an initial, a $max_n$ and a $min_n$ number of VMs. The VMs of each tenant can scale in/out with a scaling adjustment of one VM. It is assumed that the time for upgrading one batch size of hosts is equal to the cooldown, which means T is also equal to one following equation 1 (i.e. T=1). In the figures, down and up arrows on top of the VMs are used to indicate scaling in and out, respectively. Note that scaling can happen in both the old and new partitions, so the up/down arrows on the old or the new version of VM indicate the scaling of the old or the new version, respectively.

Figure 3:
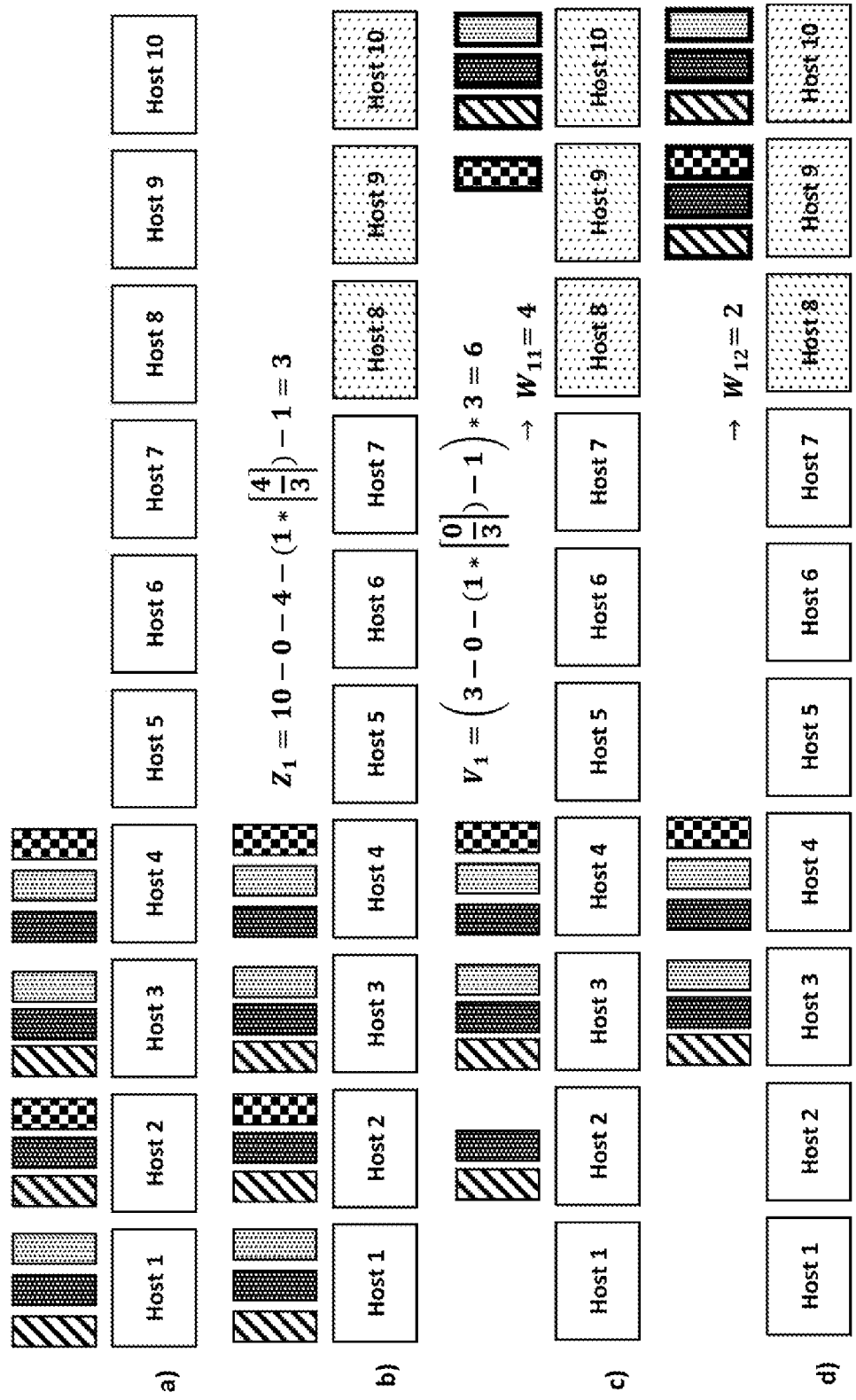
FIG. 3 illustrates a first iteration of the rolling upgrade example according to one embodiment.

FIG. 3 illustrates the first iteration of the example according to one embodiment. The initial number of un-upgraded hosts in use $X_0$ is 4, and the number of upgraded hosts $U_0$ is zero. Since none of the VMs of any tenants have been upgraded, scaling reservation is made for all four tenants of the un-upgraded hosts. According to Equation 2, the batch size for host upgrade $Z_1$ is 3. Thus, three hosts which are not in use are selected for upgrade. As used herein, to upgrade a host is equivalent to upgrade a hypervisor. Upgraded hosts are shown by a dotted pattern.

The next step is the calculation of the batch size for the VM upgrade. The number of upgraded hosts has changed to 3 ($U_1=3$) after the host upgrade. However, the number of upgraded hosts in use $Y_1$ is still equal to zero. In the first iteration there is no tenant with VM of the new version, so no scaling space is reserved for new VMs in the new partition. The total number of VMs that can be upgraded ($V_1$) is 6 in the first iteration, which is more than the number of tenants with the old VM version. To comply with the anti-affinity constraint, no more than one VM can be upgraded at a time from a single tenant. Hence, the batch size for VM upgrades ($W_{11}$) is 4 in the first sub-iteration (j=1), and all four tenants are selected; one VM for each selected tenant to upgrade. Upgraded VMs are shown in bold outlines.

At this point, the tenants that have the highest number of VMs with the old version are selected. To minimize the number of VM migration at VM consolidation, one or more hosts are identified which host most VMs from these selected tenants. In this iteration "host 1" and "host 2" are selected, and all the VMs of "host 1" and one of the VMs of "host 2" are upgraded and placed on two of the unused upgraded hosts (herein "host 10" and "host 9"). The VM images of the tenants may be upgraded offline; but in some embodiment the upgrade may be performed online.

Since not all the VMs that could be upgraded in the first iteration ($V_1$) are upgraded in the first sub-iteration, a second sub-iteration (j=2) is performed to upgrade the remaining VMs. In the second sub-iteration, the batch size for VM upgrades ($W_{12}$) is 2. According to the criteria for selection of tenants, two tenants are selected and one VM from each tenant is upgraded.

Figure 4:
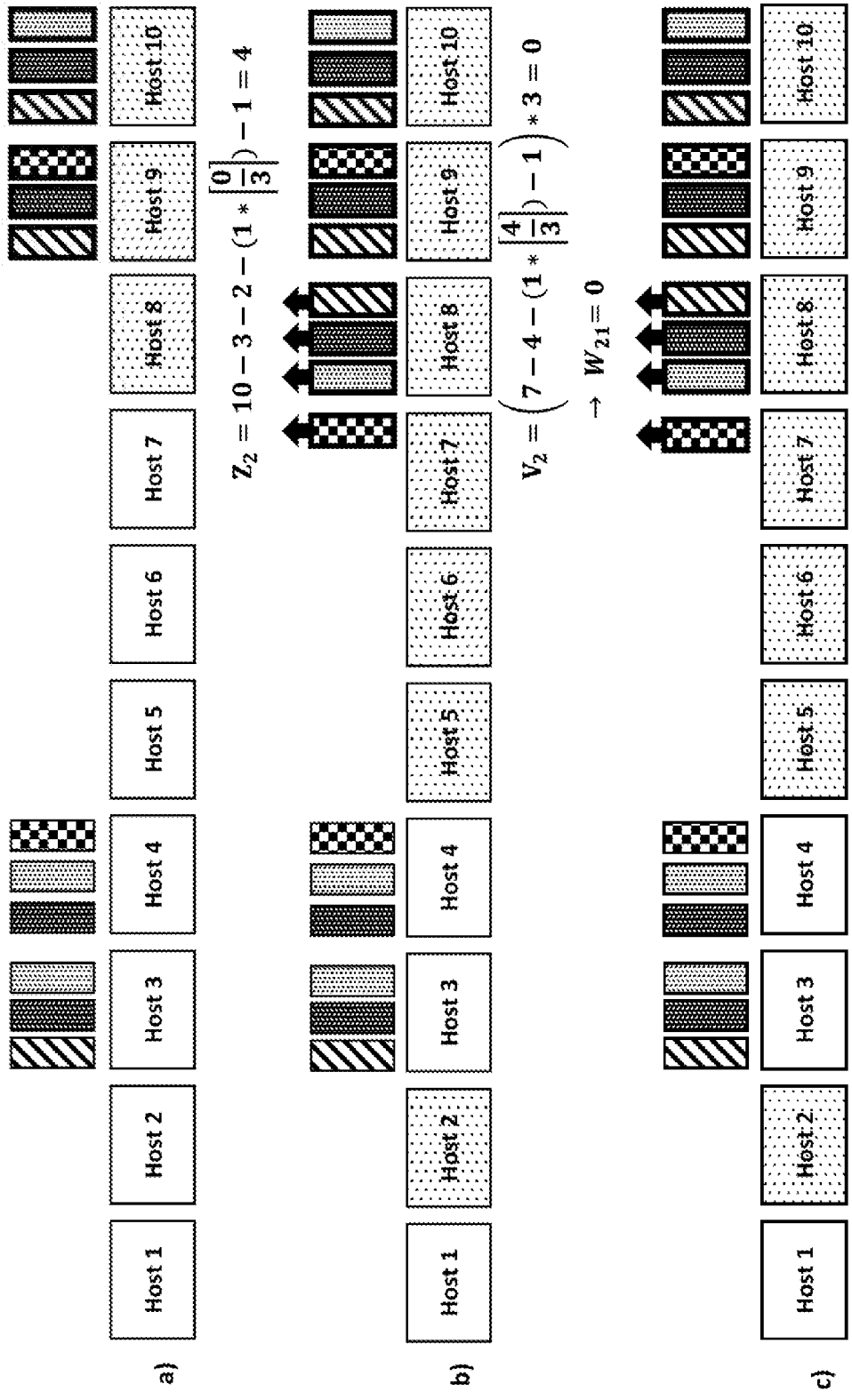
FIG. 4 illustrates a second iteration of the rolling upgrade example according to one embodiment.

In the second iteration as shown in FIG. 4, the batch size for host upgrades ($Z_2$) is 4. Thus, four unused hosts are selected and upgraded in this iteration. At this point, scaling out requests are received from the tenants that have already upgraded VMs. Since the scaling out requests are from the tenants with the new versions of VMs, if possible, the VMs are scaled with the new version on the upgraded hosts. If there are not enough upgraded hosts in the new partition to satisfy a scale out request, then the request can only be satisfied in the old partition. For example, if the scale out requests in FIG. 4 arrives before the four hosts are upgraded, then the requests can only be satisfied in the old partition. The scaling-out changes the number of upgraded hosts $U_2$ and the number of upgraded hosts in use $Y_2$ to 7 and 4, respectively. As the calculation of the total number of VMs to upgrade ($V_2$) and therefore the batch size for VM upgrades ($W_{21}$) are both zero, no VM is upgraded in this iteration.

Figure 5:
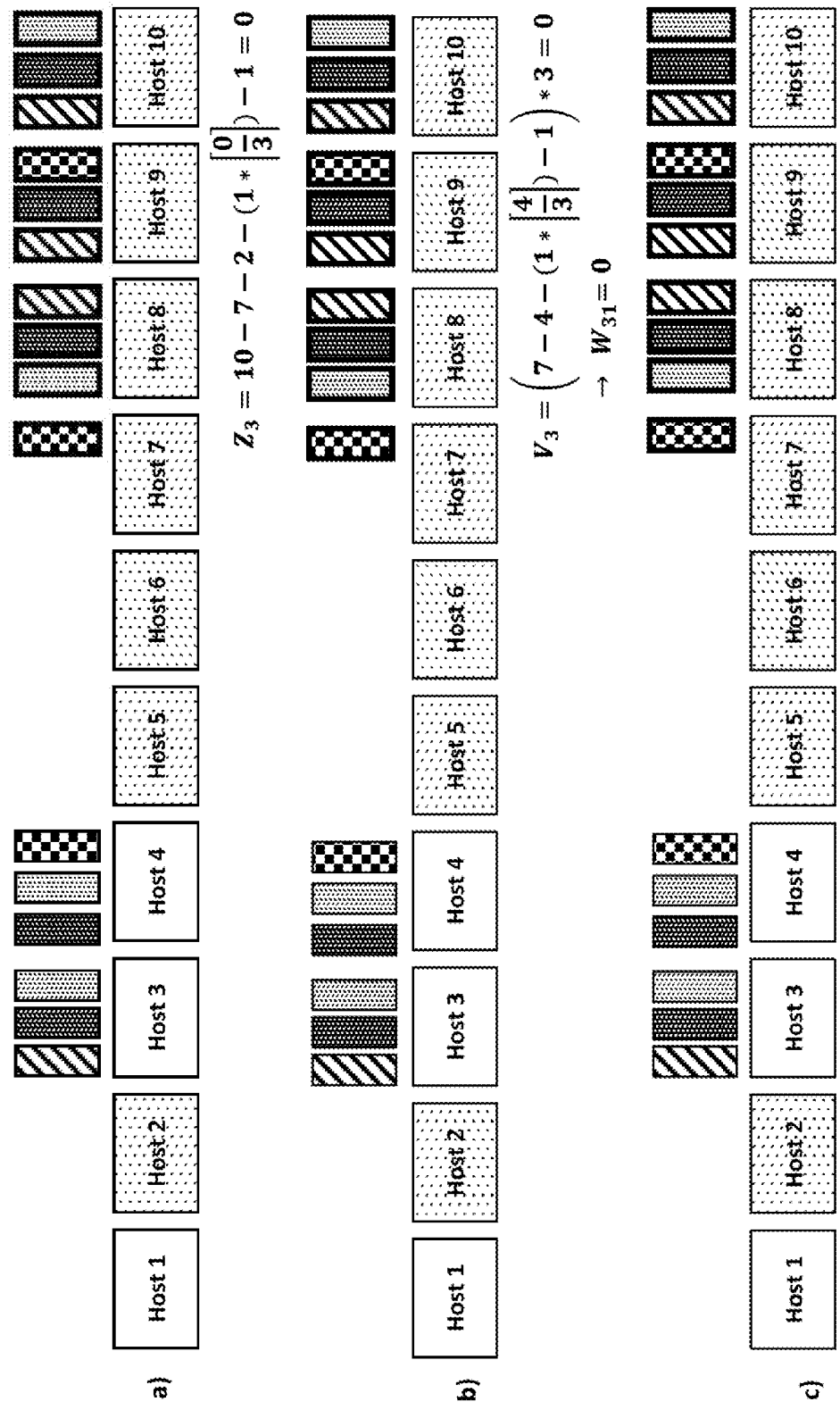
FIG. 5 illustrates a third iteration of the rolling upgrade example according to one embodiment.

In the third iteration as shown in FIG. 5, the calculations of the batch size for host upgrades ($Z_3$) and VM upgrades ($W_{31}$) are both zero. The upgrade process stops here until a scaling in request arrives that frees up enough resources.

Figure 6:
FIG. 6 illustrates a fourth iteration of the rolling upgrade example according to one embodiment.
Figure 6:
Figure 6:
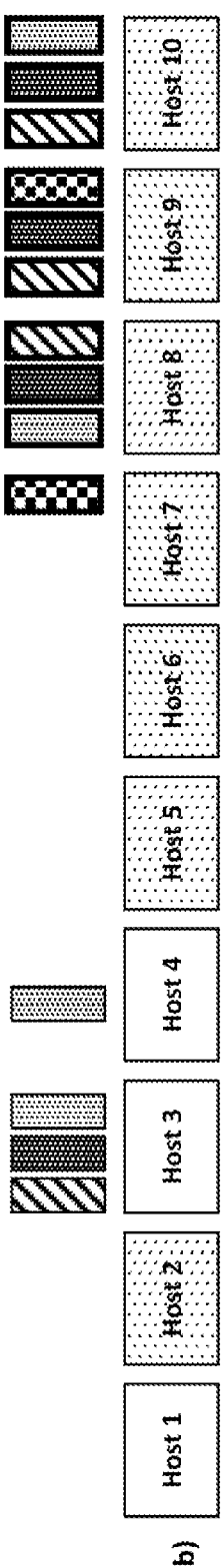
Figure 6:
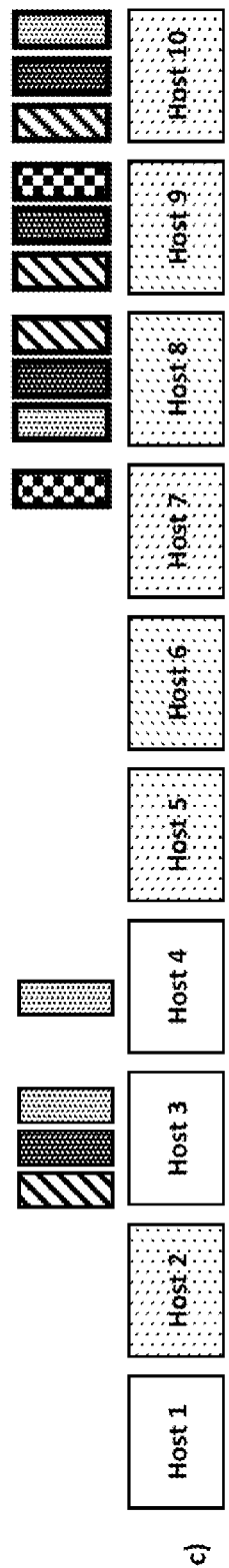

FIG. 6 shows the fourth iteration, in which scaling in requests are received from two tenants. The scaling in requests remove the VMs of the old version from the two requesting tenants. Note that if a tenant requesting a scaling in does not have any VM of the old version, then for that specific tenant the scaling in removes one of the VMs of the new version hosted on an upgraded host. However, here both of the tenants have a VM of the old version, so the scaling in removes the old version VM of these tenants. As the result of this scaling in, the batch sizes are recalculated. However, since these scaling in requests do not free up enough resources, both batch sizes are calculated to be zero. The upgrade process still cannot continue.

Figure 7:
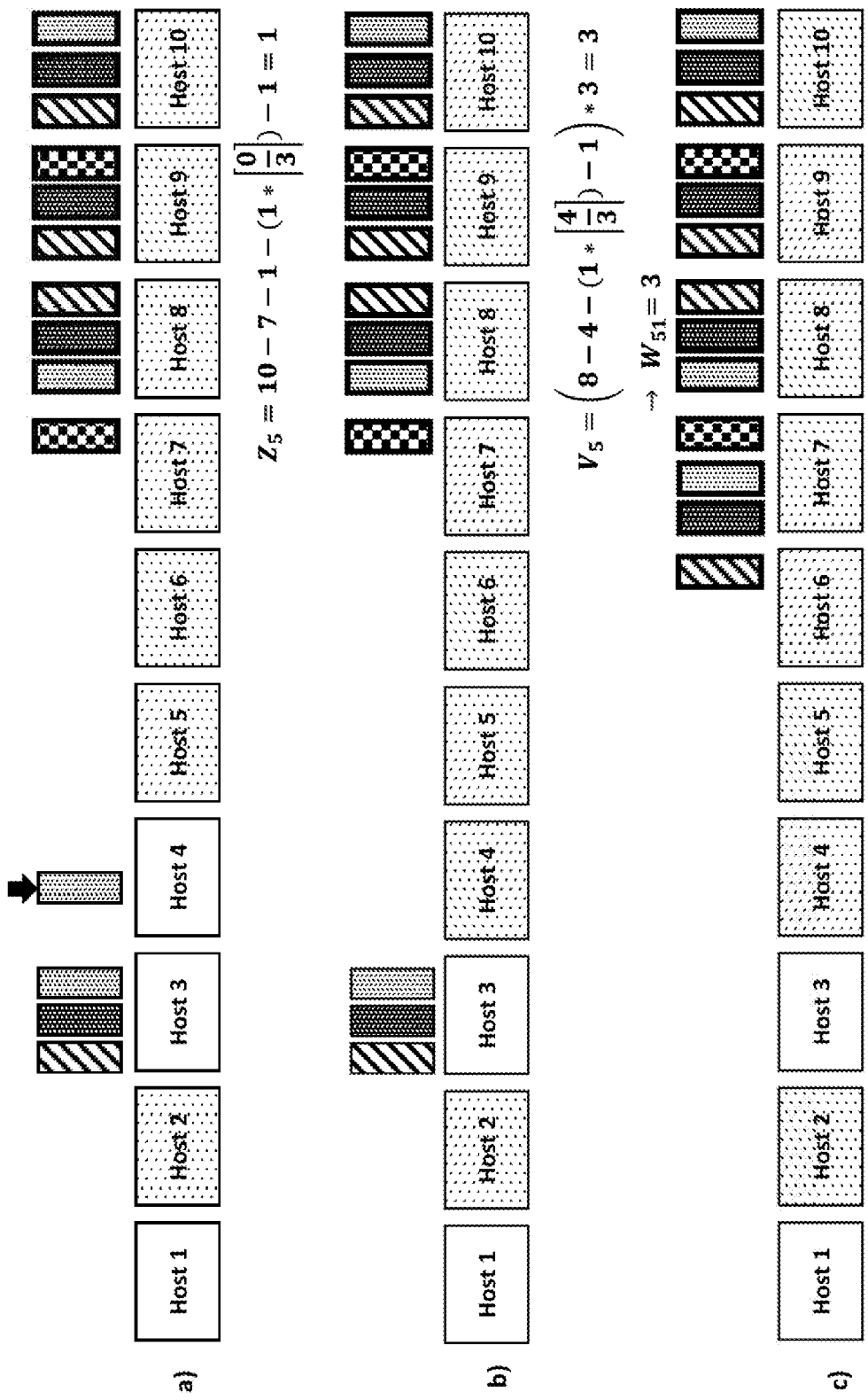
FIG. 7 illustrates a fifth iteration of the rolling upgrade example according to one embodiment.

FIG. 7 shows the fifth iteration, in which one more scaling in request is received from one of the tenants. This request frees up one of the hosts remaining with the old version. The scaling in triggers the calculations of the batch sizes. The batch size for host upgrades ($Z_5$) is 1. Thus, one of the unused and un-upgraded hosts is selected and upgraded. The total number of VMs that can be upgraded ($V_5$) and the batch size for VM upgrades ($W_{51}$) are both 3. Thus, three VMs one from each tenant are upgraded in the new partition.

Figure 8:
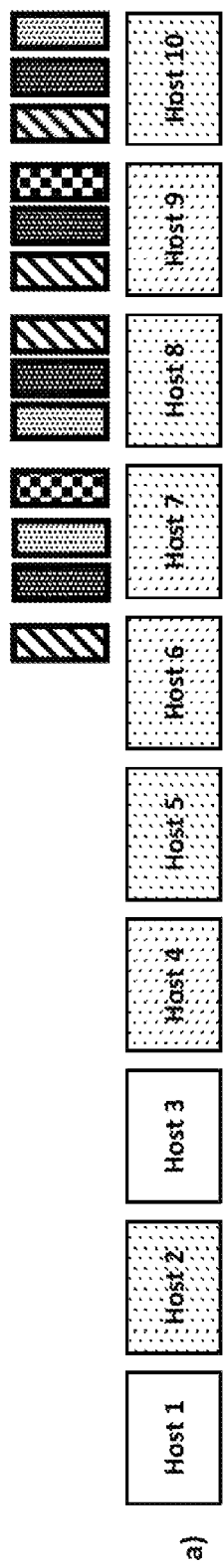
FIG. 8 illustrates a sixth iteration of the rolling upgrade example according to one embodiment.
Figure 8:
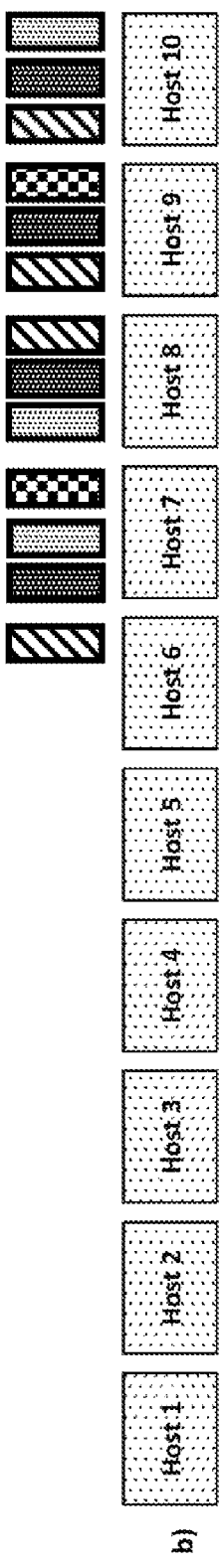

FIG. 8 shows the sixth iteration. Since the number of in-use hosts of the old version becomes zero, the calculation of the batch size for host upgrades ($Z_6$) is calculated by Equation 3. Therefore, all of the remaining hosts are upgraded, and the upgrade process completes.

Figure 9:
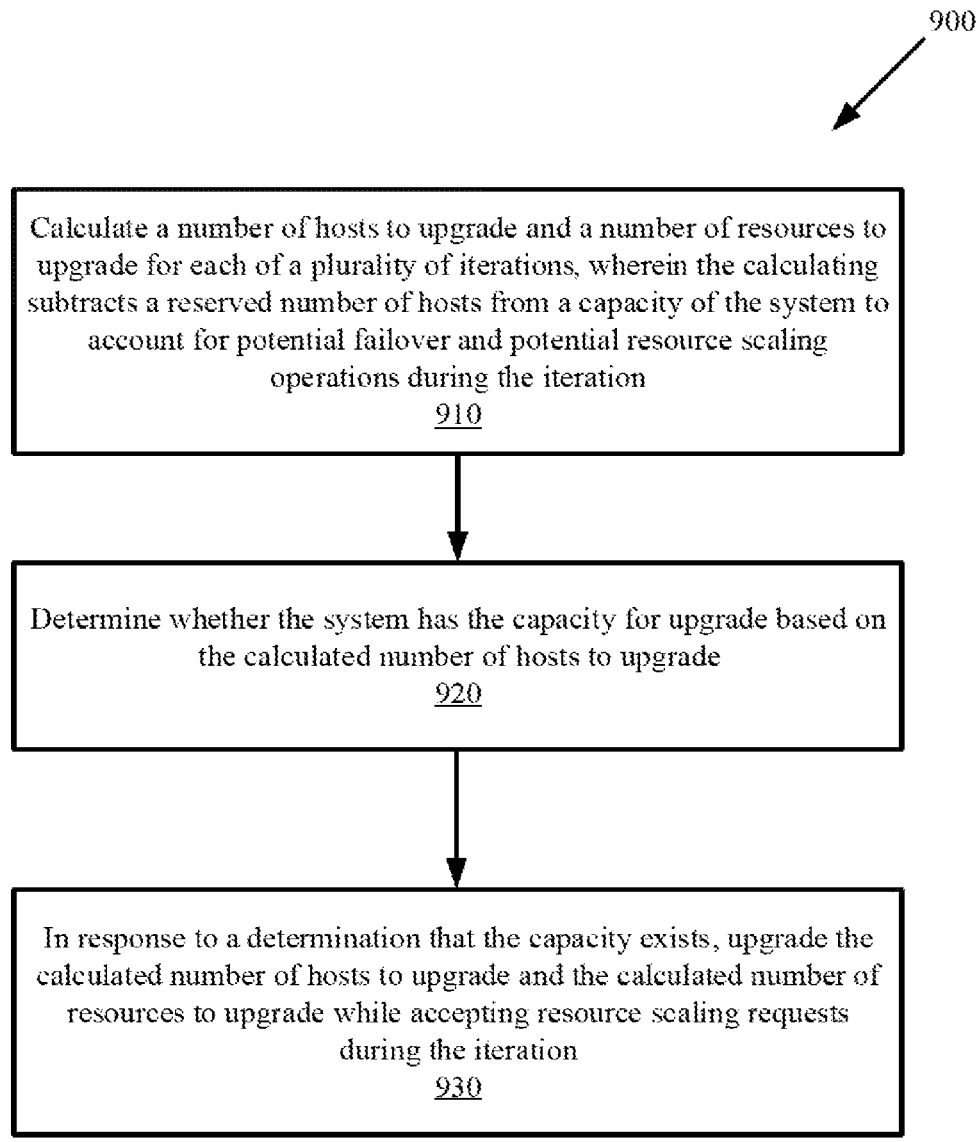
FIG. 9 is a flow diagram illustrating a method for rolling upgrade of a system according to one embodiment.

FIG. 9 is a flow diagram illustrating a method 900 for rolling upgrade of a system according to one embodiment. The system includes a plurality of hosts hosting a plurality of resources. The rolling upgrade is performed in a plurality of iterations. The method 900 begins at step 910 with calculating a number of hosts to upgrade and a number of resources to upgrade for each iteration, wherein the calculating subtracts a reserved number of hosts from a capacity of the system to account for potential failover and potential resources scaling operations during the iteration. At step 920, based on the calculated number of hosts to upgrade, it is determined whether the system has the capacity for an upgrade. Then at step 930, in response to a determination that the capacity exists, the calculated number of hosts to upgrade and the calculated number of resources to upgrade are upgraded, while accepting resources scaling requests during the iteration. The steps 910-930 are repeated in each iteration when the system has the capacity for an upgrade. If at step 920, it is determined that the system does not have the capacity for an upgrade, the method 900 comes to a pause until the system regains the necessary capacity for upgrades. At that point the method 900 resumes from step 910 until all of the resources are upgraded.

Figure 10:
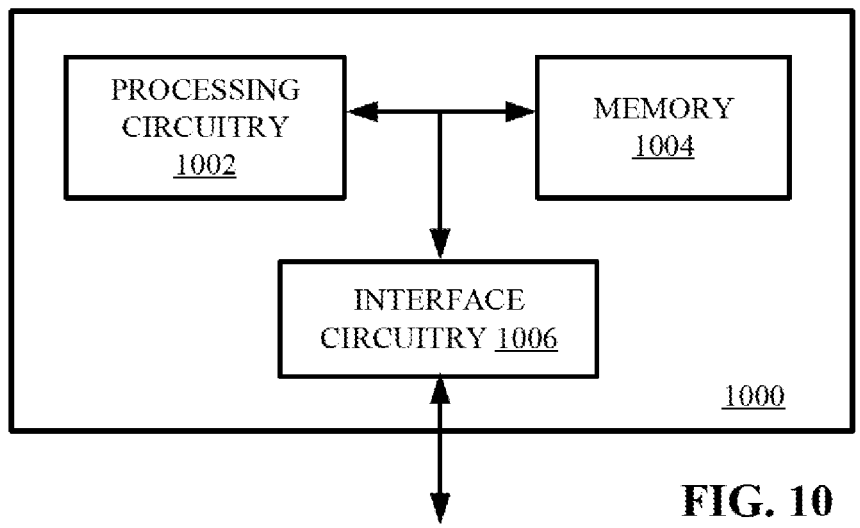
FIG. 10 is a block diagram of a system or network node according to one embodiment.

FIG. 10 is a block diagram illustrating a system 1000 according to an embodiment. In one embodiment, the system 1000 may be a network node or server in an operator network or in a data center. The system 1000 includes circuitry including processing circuitry 1002, a memory or instruction repository 1004 and interface circuitry 1006. The interface circuitry 1006 can include at least one input port and at least one output port. The memory 1004 contains instructions executable by the processing circuitry 1002 whereby the system 1000 is operable to perform the various embodiments as described herein, including the method 900 of FIG. 9.

Figure 11:
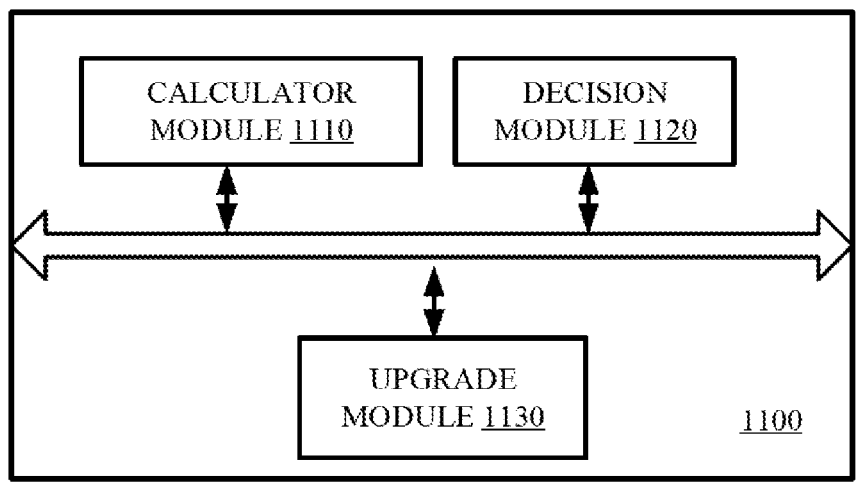
FIG. 11 is a block diagram of another system or network node according to one embodiment.

FIG. 11 is a block diagram of an example system 1100 that includes a number of modules. In one embodiment, the system 1100 may be a network node or server. The system 1100 includes a calculator module 1110 adapted or operative to calculate a number of hosts to upgrade and a number of resources to upgrade for each of a plurality of iterations. The calculation subtracts a reserved number of hosts from a capacity of the system to account for potential failover and potential resources scaling operations during the iteration. The system 1100 also includes a decision module 1120 adapted or operative to determine whether the capacity exists for upgrades based on the calculated number of hosts to upgrade, and an upgrade module 1130, to upgrade, in response to a determination that the capacity exists, the calculated number of hosts to upgrade and the calculated number of resources to upgrade while accepting resources scaling requests during the iteration. The system 1100 can be configured to perform the various embodiments as have been described herein.

Figure 12:
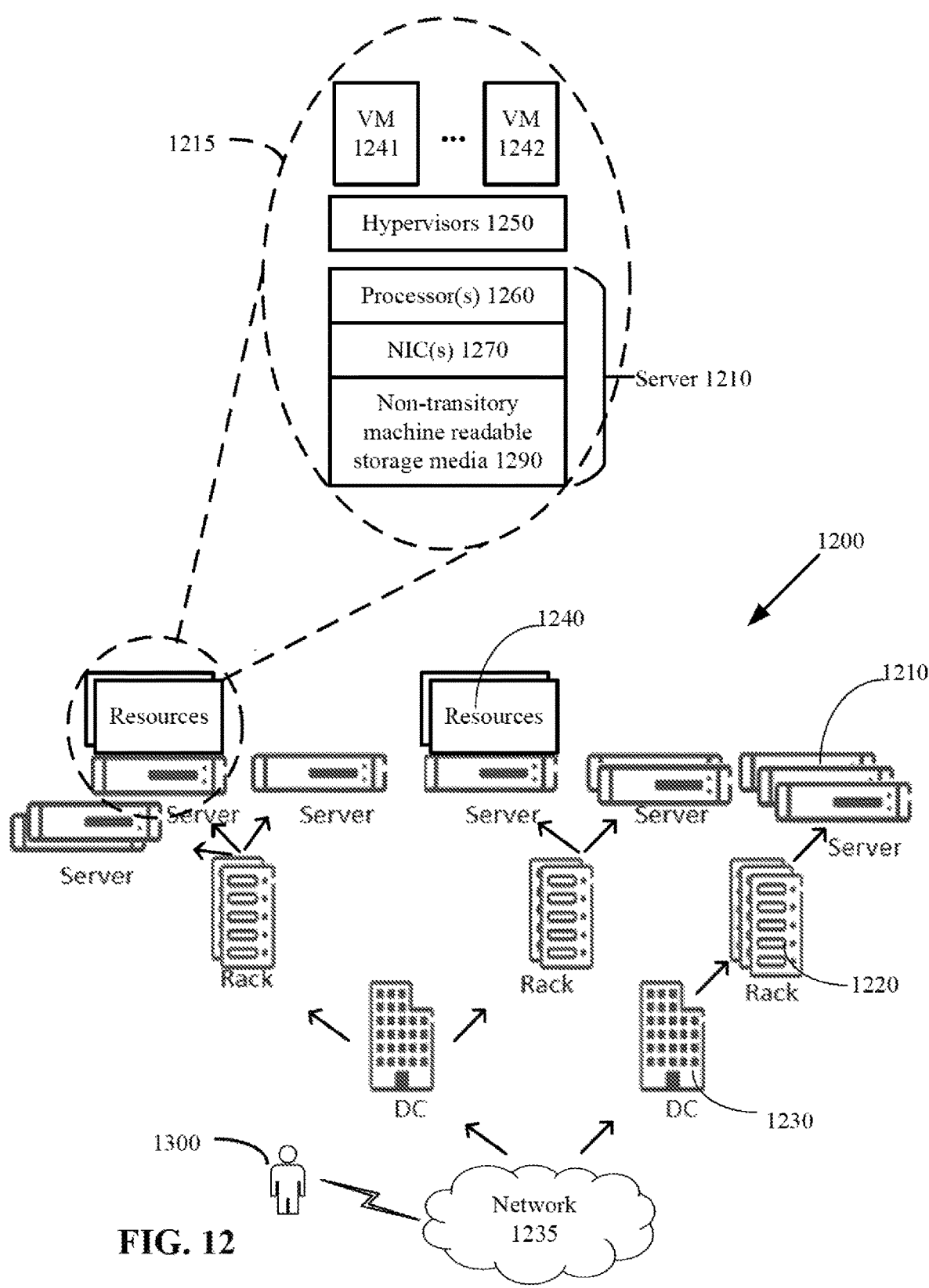
FIG. 12 is an architectural overview of a cloud computing environment according to one embodiment.

FIG. 12 is an architectural overview of a cloud computing environment 1200 that comprises a hierarchy of a cloud computing entities. The cloud computing environment 1200 can include a number of different data centers (DCs) 1230 at different geographic sites connected over a network 1235. Each data center 1230 site comprises a number of racks 1220, each rack 1220 comprises a number of servers 1210. It is understood that in alternative embodiments a cloud computing environment may include any number of data centers, racks and servers. A set of the servers 1210 may be selected to host resources 1240. In one embodiment, the servers 1210 provide an execution environment for hosting entities and their hosted entities, where the hosting entities may be service providers and the hosted entities may be the services provided by the service providers. The server 1210 and its resources 1240, as well as the hosting and hosted entities provided by the server 1210, may be upgraded according to the various embodiments as have been described herein.

Further details of the server 1210 and its resources 1240 are shown within a dotted circle 1215 of FIG. 12, according to one embodiment. The cloud computing environment 1200 comprises a general-purpose network device (e.g. server 1210), which includes hardware comprising a set of one or more processor(s) 1260, which can be commercial off-the-shelf (COTS) processors, dedicated Application Specific Integrated Circuits (ASICs), or any other type of processing circuit including digital or analog hardware components or special purpose processors, and network interface controller(s) 1270 (NICs), also known as network interface cards, as well as non-transitory machine readable storage media 1290 having stored therein software and/or instructions executable by the processor(s) 1260.

During operation, the processor(s) or processing circuitry 1260 execute the software to instantiate a hypervisor 1250 and one or more VMs 1241, 1242 that are run by the hypervisor 1250. The hypervisor 1250 and VMs 1241, 1242 are virtual resources, which may run server instances in this embodiment. In one embodiment, the server instance may be implemented on one or more of the VMs 1241, 1242 that run on the hypervisor 1250 to perform the various embodiments as have been described herein.

In an embodiment the server instance instantiation can be initiated by a user 1300 or by a machine in different manners. For example, the user 1300 can input a command, e.g. by clicking a button, through a user interface to initiate the instantiation of the server instance. The user 1300 can alternatively type a command on a command line or on another similar interface. The user 1300 can otherwise provide instructions through a user interface or by email, messaging or phone to a network or cloud administrator, to initiate the instantiation of the server instance. Alternatively, a machine owned by the user 1300 can send a request to initiate the instantiation of the server instance.

Embodiments may be represented as a software product stored in a machine-readable medium (such as the non-transitory machine readable storage media 1290, also referred to as a computer-readable medium, a processor-readable medium, or a computer usable medium having a computer readable program code embodied therein). The non-transitory machine-readable medium 1290 may be any suitable tangible medium including a magnetic, optical, or electrical storage medium including a compact disk read only memory (CD-ROM), digital versatile disc read only memory (DVD-ROM) memory device (volatile or non-volatile), memory cards, hard drive or solid state drive, or similar storage mechanism. The machine-readable medium may contain various sets of instructions, code sequences, configuration information, or other data, which, when executed, cause a processor to perform steps in a method according to an embodiment. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. A person skilled in the art would understand that variation or modification of the formulas providing similar results could be made within the spirit of the present disclosure. Alterations, modifications and variations may be effected to the particular embodiments by those of skill in the art without departing from the scope which is defined solely by the claims appended hereto.

What is claimed is:

1. A method for rolling upgrade of a system that includes a plurality of hosts hosting a plurality of resources, the method comprising:
   calculating a number of hosts to upgrade and a number of resources to upgrade for each of a plurality of iterations, wherein the calculating subtracts a reserved number of hosts from a capacity of the system to account for potential failover and potential resource scaling operations during the iteration;
   determining whether the system has the capacity for upgrade based on the calculated number of hosts to upgrade; and
   in response to a determination that the capacity exists, upgrading the calculated number of hosts to upgrade and the calculated number of resources to upgrade while accepting resource scaling requests during the iteration;
   wherein the resources form a plurality of anti-affinity groups, each of the anti-affinity groups containing the resources that are to be upgraded one at a time and placed on different hosts, the calculating further comprising:

calculating, for each iteration, a reserved number of hosts for scaling out the resources while respecting the anti-affinity groups; and wherein, when the calculated number of resources to upgrade in a given iteration is greater than the number of the anti-affinity groups having un-upgraded resources, the method further comprises:

upgrading, in the given iteration, the calculated number of hosts to upgrade when the calculated number of hosts is greater than zero; and upgrading the calculated number of resources to upgrade in multiple sub-iterations of the iteration such that at most one resource from each anti-affinity group is upgraded in each sub-iteration.

2. The method of claim 1, wherein each resource is a virtual machine, and to upgrade a host is to upgrade a hypervisor on the host.

3. The method of claim 1, wherein the hosts are service providers, and the resources are services provided by the service providers.

4. The method of claim 1, wherein the calculating further comprises:

maximizing the number of hosts to upgrade and the number of resources to upgrade in each iteration, wherein the number of resources to upgrade is calculated based on a total number of hosts that are compatible with the resources to be upgraded.

5. The method of claim 1, wherein the calculating further comprises:

calculating the number of resources to upgrade in an iteration, given that the calculated number of hosts to upgrade has been marked as upgraded in the iteration.

6. The method of claim 1, wherein, when incompatibility arises between upgraded resources and un-upgraded hosts, and between upgraded hosts and un-upgraded resources, the calculating of the number of hosts to upgrade further comprises:

calculating a reserved number of the un-upgraded hosts for the potential failover and the potential resource scaling operations during an iteration when at least one anti-affinity group has no upgraded resource and has a capacity to scale out.

7. The method of claim 1, wherein, when incompatibility arises between upgraded resources and un-upgraded hosts, and between upgraded hosts and un-upgraded resources, the calculating of the number of resources to upgrade further comprises:

calculating a reserved number of the upgraded hosts for the potential failover and the potential resource scaling operations during an iteration when at least one anti-affinity group has at least an upgraded resource and has a capacity to scale out.

8. The method of claim 1, further comprising:
calculating a number of resources to be accommodated for scaling out by: multiplying an estimated number of scaling operations per iteration by a scaling adjustment, wherein the scaling adjustment is an allowable number of resources that can be added in one scaling operation.

9. The method of claim 8, wherein the estimated number of scaling operations per iteration is calculated by:

dividing an amount of time for upgrading one host with K of the resources by a cooldown parameter, wherein K is host capacity and the cooldown parameter is a minimum amount of time between subsequent scaling operations permitted.

10. The method of claim 1, further comprising:
suspending the rolling upgrade when the calculated number of hosts to upgrade is not greater than zero; and
upon detecting a scaling-in operation of the resources, resuming the calculating for another iteration of the rolling upgrade.

11. The method of claim 1, further comprising:
upon detecting that there are no un-upgraded hosts in use, upgrading all un-upgraded hosts in a final iteration.

12. A network node comprising processing circuitry and memory, said memory containing instructions executable by said processing circuitry to perform rolling upgrade of a plurality of resources and a plurality of hosts hosting the resources, whereby said network node is operative to:

calculate a number of hosts to upgrade and a number of resources to upgrade for each of a plurality of iterations, wherein the calculate is to subtract a reserved number of hosts from a capacity of the system to account for potential failover and potential resource scaling operations during the iteration;

determine whether the capacity exists for upgrade based on the calculated number of hosts to upgrade; and upgrade, in response to a determination that the capacity exists, the calculated number of hosts to upgrade and the calculated number of resources to upgrade while accepting resource scaling requests during the iteration wherein the resources form a plurality of anti-affinity groups, each of the anti-affinity groups containing the resources that are to be upgraded one at a time and placed on different hosts, the network node is operable to:

calculate, for each iteration, a reserved number of hosts for scaling out the resources while respecting the anti-affinity groups; and wherein, when the calculated number of resources to upgrade in a given iteration is greater than the number of the anti-affinity groups having un-upgraded resources, the network node is operable to:

upgrade, in the given iteration, the calculated number of hosts to upgrade when the calculated number of hosts is greater than zero; and upgrade the calculated number of resources to upgrade in multiple sub-iterations of the iteration such that at most one resource from each anti-affinity group is upgraded in each sub-iteration.

13. The network node of claim 12, wherein each resource is a virtual machine, and to upgrade a host is to upgrade a hypervisor on the host.

14. The network node of claim 12, wherein the hosts are service providers, and the resources are services provided by the service providers.

15. The network node of claim 12, wherein the network node is operable to:

maximize the number of hosts to upgrade and the number of resources to upgrade in each iteration, wherein the number of resources to upgrade is calculated based on a total number of hosts that are compatible with the resources to be upgraded.

16. The network node of claim 12, wherein the network node is operable to:

calculate the number of resources to upgrade in an iteration, given that the calculated number of hosts to upgrade has been marked as upgraded in the iteration.

17. The network node of claim 12, wherein, when incompatibility arises between upgraded resources and un-upgraded hosts, and between upgraded hosts and un-upgraded resources, the network node is operable to:

calculate a reserved number of un-upgraded hosts for the potential failover and the potential resource scaling operations during an iteration when at least one anti-affinity group has no upgraded resource and has a capacity to scale out.

18. The network node of claim 12, wherein, when incompatibility arises between upgraded resources and un-upgraded hosts, and between upgraded hosts and un-upgraded resources, the network node is operable to:
calculate a reserved number of the upgraded hosts for the potential failover and the potential resource scaling operations during an iteration when at least one anti-affinity group has at least an upgraded resource and has a capacity to scale out.

19. The network node of claim 12, wherein the network node is operative to calculate a number of resources to be accommodated for scaling out by multiplying an estimated number of scaling operations per iteration by a scaling adjustment, wherein the scaling adjustment is an allowable number of resources that can be added in one scaling operation.

20. The network node of claim 19, wherein the network node is operative to calculate the estimated number of scaling operations per iteration by dividing an amount of time for upgrading one host with K of the resources by a cooldown parameter, wherein K is host capacity and the cooldown parameter is a minimum amount of time between subsequent scaling operations permitted.

21. The network node of claim 12, wherein the network node is operable to:
suspend the rolling upgrade when the calculated number of hosts to upgrade is not greater than zero; and
upon detecting a scaling-in operation of the resources, resume the calculating for another iteration of the rolling upgrade.

22. The network node of claim 12, wherein the network node is operable to:
upon detecting that there are no un-upgraded hosts in use, upgrade all un-upgraded hosts in a final iteration.

* * * * *